US006680477B2

(12) United States Patent
Beck et al.

(10) Patent No.: US 6,680,477 B2
(45) Date of Patent: Jan. 20, 2004

(54) HIGH SPATIAL RESOLUTION MATRIX ASSISTED LASER DESORPTION/ IONIZATION (MALDI)

(75) Inventors: Kenneth M. Beck, Kennewick, WA (US); David S. Wunschel, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/159,693

(22) Filed: May 31, 2002

(65) Prior Publication Data

US 2003/0222212 A1 Dec. 4, 2003

(51) Int. Cl.[7] ........................ G01N 24/00; B01D 59/44; H01J 49/00

(52) U.S. Cl. ........................ 250/288; 250/281; 250/282; 436/173

(58) Field of Search ................................ 250/281, 288, 250/282; 436/173

(56) References Cited

U.S. PATENT DOCUMENTS

| | | | | | |
|---|---|---|---|---|---|
| 3,813,544 | A | * | 5/1974 | Franzen et al. | 250/281 |
| 4,740,692 | A | * | 4/1988 | Yamamoto et al. | 250/282 |
| 5,117,108 | A | | 5/1992 | Muller et al. | 250/288 |
| 5,622,824 | A | * | 4/1997 | K oster | 435/6 |
| 5,654,545 | A | * | 8/1997 | Holle et al. | 250/287 |
| 5,674,743 | A | * | 10/1997 | Ulmer | 435/287.2 |
| 5,808,300 | A | * | 9/1998 | Caprioli | 250/288 |
| 5,955,731 | A | | 9/1999 | Bergmann et al. | 250/288 |
| 6,080,586 | A | * | 6/2000 | Baldeschwieler et al. | 436/173 |
| 6,111,251 | A | * | 8/2000 | Hillenkamp | 250/288 |
| 6,281,493 | B1 | | 8/2001 | Vestal et al. | 250/287 |

OTHER PUBLICATIONS

Galicia, MC et al., "*Atmospheric Pressure Matrix–Assisted Laser Desorption/Ionization in Transmission Geometry*", p. 1891–1895. 2002.

Lefevre, HW et al., "*Using a Fast–Neutron Spectrometer System to Candle Luggage for Hidden Explosives*", p. 1–10. 2002.

Overley, JC et al., "*Results of Blind Tests for Explosives in Luggage Using Fast–Neutron Transmission Spectroscopy (FNTS)*", p. 1–9. 2002.

Sieger, GE, "*Use of Simulated Suitcases in Refining Explosive Detection Algorithms*", p. 1–10. 2002.

Spengler, B et al., "*Scanning Microprobe Matrix–Assisted Laser Desorption Ionization (SMALDI) Mass Spectrometry: Instrumentation for Sub–Micrometer Resolved LDI and MALDO Surface Analysis*", p. 735–748. 2002.

Winograd, N et al., "*TOF–SIMS Imaging Mass Spectrometry and Combined Chemistry*", p. 34–50. 2002.

* cited by examiner

*Primary Examiner*—Bruce Anderson
*Assistant Examiner*—Mary El-Shammaa
(74) *Attorney, Agent, or Firm*—Todd J. Harrington

(57) ABSTRACT

Disclosed is an invention that provides a system and process for focusing light to micron and submicron spot sizes for matrix assisted laser desorption/ionization (MALDI). Moreover, the present invention features a second process and system for creating a correlated optical image of the ion desorption region of a sample substrate.

35 Claims, 4 Drawing Sheets

HIGH SPATIAL RESOLUTION MATRIX ASSISTED LASER DESORPTION/IONIZATION (MALDI)

BACKGROUND OF THE INVENTION

Matrix assisted laser desorption/ionization mass spectrometry (MALDI-MS) has become an increasingly common tool for protein analysis in biological research since its development in 1988 (Karas, et al 1988, Tanaka et al RCMS, Fenseleau). The simple sample preparation, short analysis time and sensitivity have made this a powerful technique for protein identification (Fenseleau, Anal. Chem. 1997). Furthermore, the ability to generate intact molecular ions for whole proteins directly from complex mixtures makes this a particularly attractive technique for biological samples. (Redeker et al Anal Chem 1998). Electrospray ionization has proven to be another powerful and widespread ionization technique for mass spectrometric analysis of proteins and peptides that provides a means to directly couple liquid separations and mass analysis (Washburn, M. P., D. Wolters, and J. R. Yates III Nat. Biotech. 2001—Veenstra, T. D., S. Martinovic, G. A. Anderson, L. Pasa-Tolic, and R. D. Smith JASMS 2000). However the necessity of a liquid phase for the samples prior to ionization is in contrast to MALDI-MS where the sample is generally allowed to dry on a surface in combination with matrix molecules. It is the ability to generate ions from a solid phase sample that has led to a unique application of this technique whereby the location of the analyte within a heterogenous sample can be determined along with its mass.

MALDI-MS has been used to obtain mass spectra for proteins and peptides from precise X-Y locations from within a complex biological sample such as single cells (Garden et al JMS 1996—Chaurand, Stoeckli, and Caprioli Anal Chem 1999.). An extension of this approach was later described where multiple mass spectra were obtained by rastoring across the sample in a grid like pattern across the sample to form the pixels of an image.—(Stoeckli, M., T. B. Farmer, and R. M. Caprioli JASMS 1999—Caprioli, Farmer, Gile Anal Chem 1997) Using this data, the mass spectra could then be reassembled to create an image detailing the two dimensional position for a particular m/z value and therefore the corresponding protein. This has been demonstrated with several types of tissues and most dramatically with tissue sections from a rat brain (Todd et al, 2001, Stockle et al 2001-Stoeckli, Caprioli Nat. Med. 2001).

Other types of desorption/ionization mass spectrometry have been used to generate an "ion image", but have generally used relatively harsh ionization methods, such as secondary ion mass spectrometry and laser ablation, and were limited to examining low molecular weight species (Belu, A. M. et al Anal Chem. 2001, Todd et al, 2001,—Stockle et al 2001-Kossokovski et al 1998). Two of these reports achieved a very tightly focused laser beam with near field microscopy fibers (Stockle et al 2001-Kossokovski et al 1998). However, one limitation of the near field microscopy approach is the fluence achievable at the fiber optic tip. Fiber optic damage thresholds are too easily exceeded when the tip diameter is reduced to 150–200 nm. Precision control of laser intensity and beam profile is required to inhibit fiber optic tip heating and self-ablation. In addition, because of the necessity for the fiber optic tip to be in the proximity of the desorption surface; contamination of the tip surface is a constant concern. Coupled with the effect of laser heating, tip lifetime is compromised.

Several challenges to creating an image from mass spectral data have been identified in prior work. Among them, are the need to evenly distribute the matrix over the sample to generate a homogeneous surface, removal of contaminant peaks that may suppress the signal of other analytes, and visualization of the tremendous amount of data generated by this technique. These issues have been described in a recent review (Todd, P. J and R. M. Caprioli. JMS 2001). One limitation that exists is the resolution that can be achieved when creating the "protein image". The picture resolution is limited by the pixel size achievable, which is in turn limited by the size of the laser spot used to perform the ionization. Typically the laser spot size used to obtain MALDI-MS spectra is on the order of 25 μm in diameter (Stockle, R., R. Zenobi Anal Chem) with limitations at the 1 μm level mentioned (Todd et al 2001). However, the laser spot size reliably used for MALDI imaging has remained at 5 to 100 μm. (ibid.). While this provides ample resolution to distinguish structures within tissue sections or single neurons from *A. californica* (cells on the order of 92 μm), smaller structures/cells cannot be resolved from one another using this pixel size (Rubakhin, S. S. et al J. Neurophys 1999). In particular, microbes are often on the order of 1–2 μm in length and great resolution is required (Auerbach, I. D. et al J. Bact. 2000). Reductions in laser spot size are needed in order to generate MALDI-MS images of cells and extracellular structures on the microbial scale.

An improvement in laser focus can also lead to additional benefits by improving the ability of MALDI-MS to ionize extremely small protein samples in the analysis of dense protein arrays. Currently, sample plates holding up to 384 sample wells (each ~2 mm in diameter), are used for high throughput protein analysis using MALDI-MS. Manufacturers have introduced sample plates such as the "Anchor chip™" with affinity or adsorptive surfaces to concentrate the sample on a small area (Bruker Daltonics Inc., Product information literature, 2001). These aid in concentrating the sample as well as potentially creating more tightly packed arrays of samples with smaller spots from 200 to 800 μm in diameter. Meanwhile there have been other notable developments in deposition of small sample spots for analytical arrays that may have application MALDI-MS protein analysis. Methods creating small protein spots by spray deposition have been described with spots ranging from 100 to 500 microns (Onnerfjord, P et al. Anal Chem 1998—Moerman, R., et al. Anal. Chem.2001). Furthermore, microstructured devices have been fabricated as microreactors with features on the 1 to 5 μm scale with reactor wells of 15 μm being produced (Grzybowski, B. A., R. Haag, N. Bowden, and G. M. Whitesides, Anal. Chem 1998). While these spots are still above the typical laser spot size used for MALDI-MS, a recent report of protein samples being deposited in 15 nm diameter spots has appeared (Perkel, C. The Scientist 2002, 16[5], p.34,). Clearly, as technologies for depositing arrays of samples improve, methods for producing smaller laser spots for both ionization and imaging in association with MALDI-MS are needed.

The development and application of tightly focused MALDI in the present invention allows for generation of higher resolution images detailing intact protein location and the creation of "protein images" of a small sample area that can be compared to optical images to reveal their location within a 2-D sample.

SUMMARY OF THE INVENTION

One object of the present invention provides a system and process for focusing light to a spot size for matrix assisted laser desorption/ionization (MALDI). A coherent light source, such as a laser or infrared light source, may be directed through at least one confocal microscopic objective to create a desorption/ionization source at the surface of a MALDI sample plate adapted to receive a sample substrate within the focal working distance of the microscopic objective. The light is transported by at least one fiber optic cable to at least one confocal microscopic objective. At least one collimating fiber optic coupler is employed to collimate the light to an aperature of at least one fiber optic cable. A insulating microscopic objective holder holds the microscopic objective and insulates it from the electrical fields of the MALDI. At least one adapter secures the insulating microscopic objective holder. At least one X, Y, positioner moves the microscopic objective in the X, Y co-ordinates. At least one Z positioner moves the microscopic objective in the Z co-ordinate. Finally, a mass analyzer is used to analyze ions desorbed from the sample substrate.

A preferred embodiment of the present invention provides a system and process for focusing light to a submicron spot size for matrix assisted laser desorption/ionization (MALDI). A coherent light source, such as a laser, is used to generate ultra-violet light. At least one confocal microscopic objective is used to create a desorption/ionization source of sub-micron spatial resolution at the surface of a MALDI sample plate. The ultra-violet light generated by the laser is transported by at least one fiber optic cable to at least one confocal microscopic objective. A sample substrate is placed on a sample plate to hold it within the focal working distance of the microscopic objective and a mass analyzer is used to analyze the sample after it has been ionized.

As used herein, a sample substrate is a combination of an analyte and an appropriately absorbing sample matrix. As used herein, working distance includes the distance from the front lens element of the objective to the closest surface of the coverslip when the specimen is in sharp focus. In the case of objectives designed to be used without coverslips, the working distance is determined by the linear measurement of the objective from lens to the specimen surface. As used herein, a mass analyzer is any device capable of separating and detecting ions based upon their mass to charge (m/z) ratio. It includes mass spectrometer devices operated under vacuum (from 760 torr down to $10^{-9}$ torr), such as a time-of-flight mass spectrometer, and devices operated at or near atmospheric pressure (e.g. an ion mobility spectrometer).

In another arrangement of the system, at least one confocal microscopic objective is positioned above the slide.

Optionally, the slide may be transparent and at least one confocal microscopic objective is positioned below the transparent slide.

In a further arrangement of the system, the mass analyzer includes at least one ion mobility spectrometer alone or in tandem with a mass spectrometer.

In still another arrangement of the system, the mass analyzer includes a mass spectrometer having at least one evacuated internal chamber.

In still another further arrangement of the system, the confocal microscopic objective and sample plate in either of the prior-mentioned arrangements may be positioned outside of a vacuum chamber. In this arrangement, the ions produced from the slide are transmitted into the evacuated chamber of the mass analyzer.

The present invention also features a process for focusing a light source to a micron and sub-micron spot sizes for matrix assisted laser desorption/ionization (MALDI), including the steps of (i) depositing a sample substrate containing analyte and an appropriately absorbing matrix on a sample plate; (ii) generating a coherent light source; (iii) positioning the sample plate within the focal working distance of at least one confocal microscopic objective; (iv) positioning at least one confocal microscopic objective in a geometry which does not interfere with the path of desorbed sample ions; (v) coupling at least one confocal microscopic objective to the coherent light source, such as a laser, with at least one fiber optic cable; (vi) focusing the coherent light source at least one microscopic objective to create a desorption/ionization laser source of submicron and micron spatial resolution at the sample substrate; (vii) ionizing the sample substrate; (viii)separating and detecting ions from the ionized sample substrate in one or more stages using an appropriate mass separation and analysis method.

In another arrangement of the process, at least one confocal microscopic objective is positioned above the sample plate.

Optionally, the sample plate may be transparent and at least one confocal microscopic objective is positioned below the transparent sample plate.

In a further arrangement of the process, the mass analyzer includes at least one ion mobility spectrometer alone or in tandem with a mass spectrometer.

In still another arrangement of the process, the mass analyzer includes at least one evacuated internal chamber, such as a mass spectrometer.

Moreover, the present invention features a second process for creating a correlated optical image of the ion desorption region of a sample substrate. The process may include (i) depositing a solution containing an analyte and an appropriately absorbing matrix on a MALDI sample plate; (ii) generating a coherent light source; (iii) positioning the sample plate within the focal working distance of at least one confocal microscopic objective; (iv) coupling at least one confocal microscopic objective to the coherent light source, such as a laser, with at least one fiber optic cable; (v) positioning at least one confocal microscopic objective in a geometry which does not interfere with the path of desorbed sample ions; (vi) focusing the coherent light through said at least one microscopic objective to create a desorption/ionization ultra-violet light source of submicron spatial resolution directed at said sample substrate; (vii) ionizing the sample substrate; (viii) illuminating the sample substrate; (ix) transferring an optical image of the ionized sample substrate using said at least one fiber optic cable; and (x) separating and detecting desorbed ions from said ionized sample substrate in one or more stages using an appropriate mass separation and analysis method.

Furthermore, the present invention also includes a system for creating a correlated optical image of the ion desorption region of a sample substrate. The system may include a) a coherent light source, such as a laser, b) at least one confocal microscopic objective to create a desorption/ionization source of sub-micron spatial resolution at the surface of a MALDI sample plate, c) a sample substrate and a sample plate to hold the sample substrate, d) a device for capturing an optical image of the sample substrate, such as a charged coupled device (CCD) camera and f) an image display unit operatively connected to the optical imaging device through a fiber optic cable or other means.

For a better understanding of the present invention, together with other and further objects thereof, reference is made to the following description, taken in conjunction with the accompanying drawings, and its scope will be pointed out in the appending claims.

DETAILED DESCRIPTION

Figure 1:
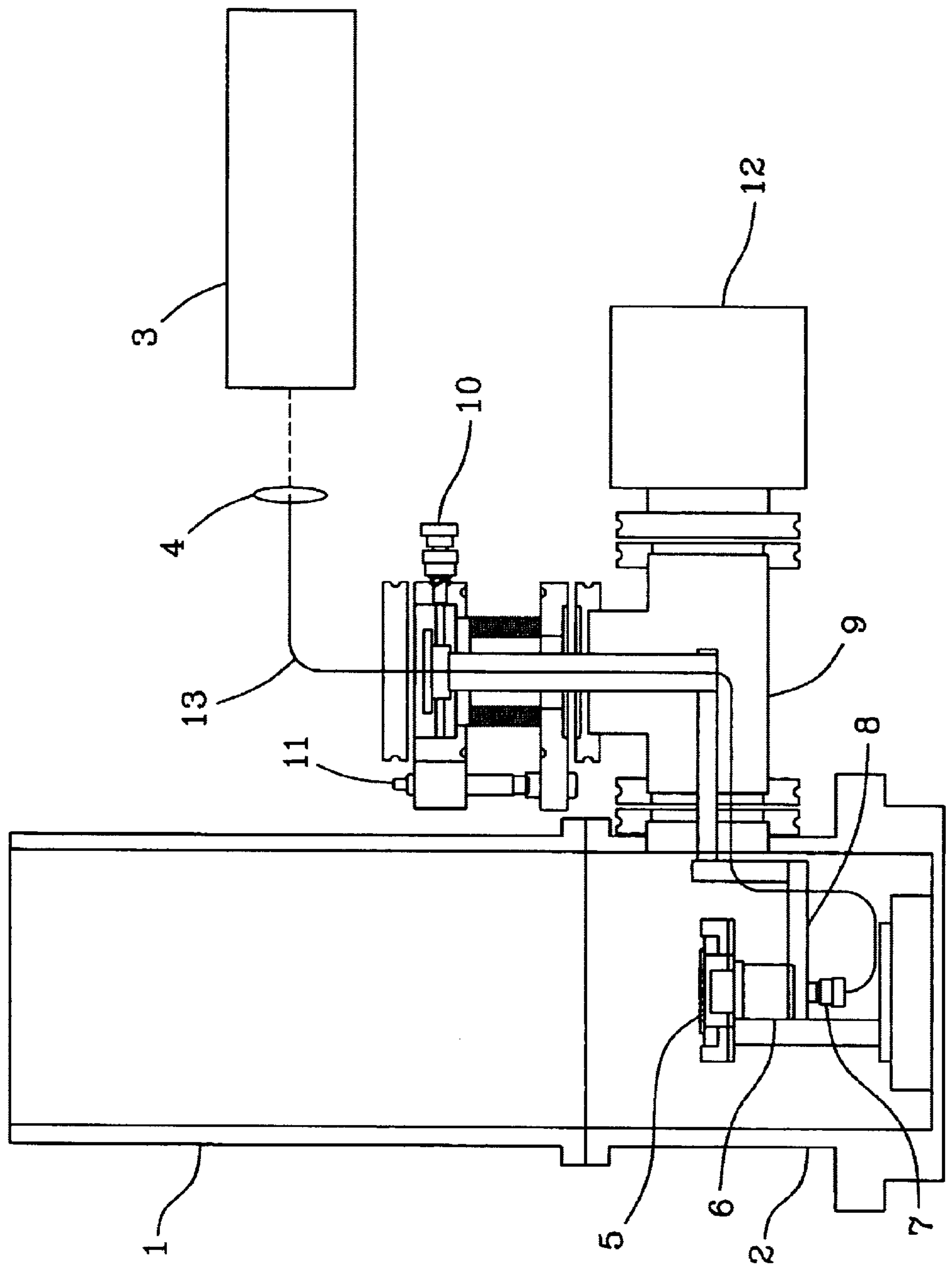
FIG. 1 Schematic of a system for focusing light to a submicron spot size for matrix assisted desoption/ionization (MALDI).

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. In particular, the invention is not limited to operation within the vacuum chamber of a mass spectrometer, as is shown in the FIG. 1, but may also be utilized at atmospheric pressure with transmission of the ions into the mass spectrometer's evacuated chamber using the mass spectrometer as the only mass analyzer or at atmospheric pressure with an ion mobility spectrometer alone or in tandem with a mass spectrometer.

The present invention increases the analytical spatial resolution by decreasing the laser spot size used for ionization. A novel source modification has been employed to allow for transmission of the beam from the laser source via fiber optic cable and focusing of the laser spot size to the diffraction limit of the laser wavelength. Utilizing proven approaches in confocal microscopy, the laser is focused using an objective lens and the resulting focused beam is then used to ionize the sample at spatial resolution levels not achieved by other means. A Nd:YAG laser has been employed with the tripled 355 nm wavelength used for ionization. In one embodiment, the objective is positioned below the sample requiring transmission through the sample for ionization.

One further advantage of this modification for analysis of a biological sample by MALDI-MS is that the orientation of the confocal objective also allows for simultaneous optical imaging of the sample. In this way simultaneous correlated optical imaging and mass analysis of micron and submicron structures can be performed with both optical and mass spectrometric imaging in a single apparatus.

FIG. 1 depicts one embodiment of a system for focusing light to a submicron spot size for matrix assisted laser desorption/ionization (MALDI). This embodiment utilizes a time-of flight mass spectrometer 1 to capture and analyze the ions that includes a MALDI vacuum chamber 2. The mass spectrometer 1 may be any appropriate mass analyzer. A substrate is positioned on a MALDI sample plate 5 that is placed within the MALDI vacuum chamber 2. The sample plate 5 holds a sample substrate that may include an analyte and an appropriately absorbing matrix. The matrix molecules must absorb a sufficient amount of energy at the wavelength of the laser used for desorption/ionization to rapidly expand (along with the analyte molecule—a protein in our case) into a gas phase and transfer a charge to the analyte while either in the solid or gas phase. Examples of an appropriately absorbing matrix for a nitrogen laser emitting a 337 nm or Nd:YAG Laser emitting at 355 nm would be ferrulic acid, sinnipinic acid, alphacyano-cinniminic acid, dihidroxybenzoic acid, and 3-hydroxypicolinic acid. For an infrared laser emitting at 2.94 micron, the appropriately absorbing matrices could be glycerol, water or other compounds with an "O-H stretch" that absorb at the wavelength used.

A microscopic objective 6 may be positioned below the sample plate 5 to create a desorption/ionization laser source of <500 nm spatial resolution at the surface of the sample. Utilizing a laser source with a spatial beam profile which can be described by a Gaussian function, the spot size at the focus of an optic in the beam path is suitably described as twice the beam radius ($\omega_0$) at the Gaussian beam waist ($z_0$) where, $$\omega_0 = z\lambda/\omega(z)\pi \text{ as } \tilde{z}\rightarrow\infty$$

To guarantee a well-characterized Gaussian laser source in our preferred configuration, we have selected to use a Nd:YAG laser 3 (Coherent Infinity 40–100) operating at 355 nm. This laser source uses a laser diode as a pump source with the oscillator built as a ring cavity. Amplification occurs using a process of Stimulated Brillouin Scattering (SBS). The fundamental laser beam is reflected through the amplification Nd:YAG rods using a mirror induced by SBS in a cell filled with the compound CFC 113 This "phase conjugation" or "time reversal" mirror reflects the laser beam, so that it perfectly re-traces its wave front as it is amplified additional times in the Nd:YAG rods—something not possible with conventional optics. The Coherent Infinity 40–100 is recognized as producing nearly perfect $TEM_{00}$ single mode Gaussian spatial pulses of 3 ns temporal width.

The Rayleigh criterion for spatial resolution is conveniently written as, $$d = \text{Diameter of spot size} = 0.61\lambda/\text{N.A.}$$

Where N.A. is the numeric aperture of the optic. In our case, the objective has an N.A.=0.75. Thus, the diffraction limit for our spot size in the preferred configuration is seen to be, $$d = 289 \text{ nm}$$

The present inventions spot size has been measured to 414 nm. By coupling the 355 nm output into our fiber optic 13, and then to our Carl Zeiss "Fluar" confocal microscopic objective 6, we have been able to measure the produced near-diffraction limited laser spot. We have measured this laser spot, 2 $\omega(z)$, as it diverges from the objective at various distances, z, from the beam waist, $z_0$. In this way we have been able to calculate the effective average beam radius and spot size at the focus of our objective in our preferred configuration.

An electrically insulating microscopic objective holder 8 holds the objective 6 and insulates the microscopic objective 6 from the electrical fields of MALDI-MS. A turbo molecular pump 12 pumps the vacuum chamber. A "T" shape adapter 9 holds the objective positioner 8 and fiber optic 7. The X,Y positioner/micrometer 10 moves the objective 6 in the X and Y co-ordinates. The Z positioner/ micrometer 11 moves the objective in the Z co-ordinate. A mirror/ collimating coupler from fiber optic 7 collimates the laser beam to the aperture of the fiber optic. In operation, it focuses the laser beam to the aperture of the fiber optic cable.

Figure 2:
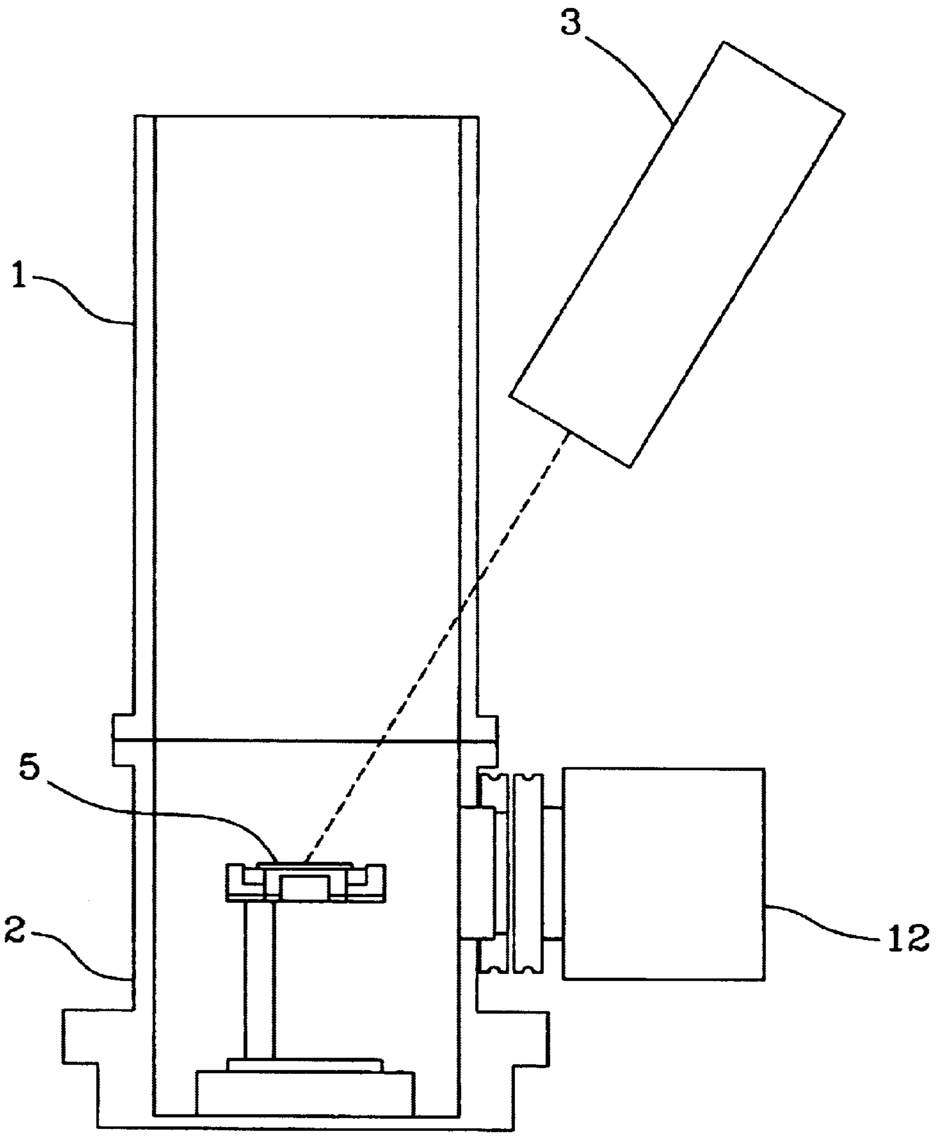
Fig. 2 (Prior Art)
FIG. 2 Schematic of prior art to generate a light source for current use in MALDI FIG. 3 Schematic of present invention as a system for creating a correlated optical image of the ion desorption region of a sample substrate FIG. 4 Illustrates the positive ion spectra for angiotensin collected using 64 laser shots.

FIG. 2 depicts prior art utilizing a nitrogen laser 3 that generates a coherent light source and is positioned at an acute angle above the MALDI sample 5. The slide resides inside a MALDI vacuum 2. A time of flight mass spectrometer 1 is attached to MALDI vacuum chamber 2 to capture and analyze the ions. A turbo pump 12 is used to pump the MALDI vacuum chamber 2. The prior art can only reach a certain spot size because the laser interferes with the escaping ions. This preferred embodiment overcomes this limitation by using confocal microscopy to introduce ionizing light and mounting it on the reverse side of a quartz MALDI plate to create a desorption/ionization laser source of <500 nm spatial resolution.

Figure 3:
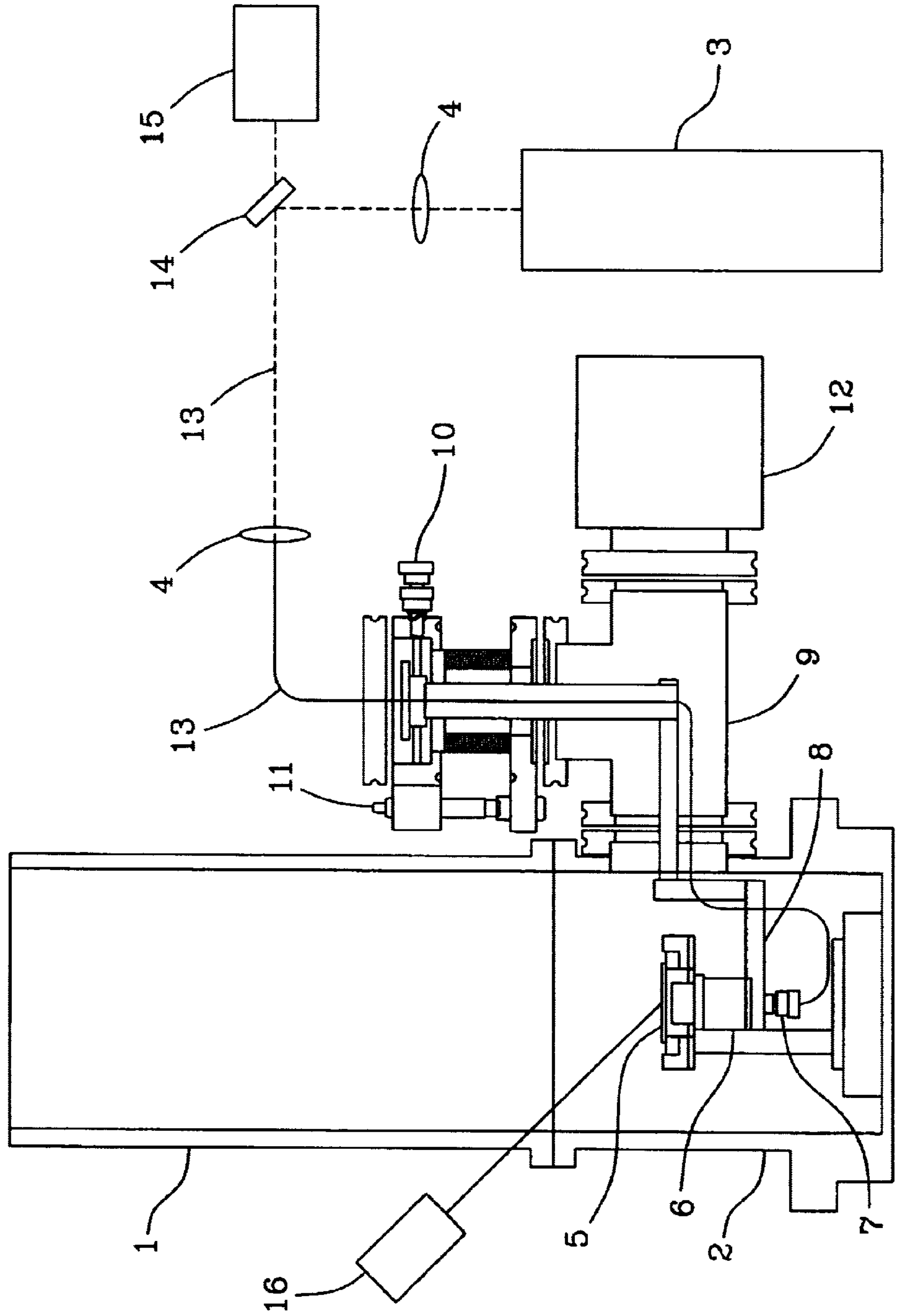

FIG. 3 depicts a further embodiment of the present invention as a system for creating a correlated visual image of the ion desorption region of a sample substrate. This embodiment employs a ND:YAG laser 3 to generate coherent ultra-violet light. The light is projected through a collimating fiber optic couplers 4 and is reflected off a mirror 14 and through a second collimating fiber optic coupler 4 which directs the ultra-violet light into a first end of a fiber optic cable 13 and exits out a second end of fiber optic cable 13. After exiting the second end of the fiber optic cable, the ultra-violet light is directed through a mirror/collimating coupler 7 that focuses the laser beam to the aperture of the fiber optic. A microscopic objective 6 is placed below the sample plate 5 to create a desorption/ionization coherent light source of <500 nm spatial resolution at the surface sample. An electrically insulating microscopic objective holder 8 holds the objective 6 and insulates the microscopic objective 6 from the electrical fields of MALDI-Mass Spectrometer. A substrate is positioned on a MALDI sample plate 5 that is placed within the MALDI vacuum chamber 2. A sample illuminator 16 illuminates the sample substrate to create an optical image. The optical image is transported back through fiber optic cable 13. The image is projected through collimating fiber optic couplers 4 and toward mirror 14. Mirror 14 reflects laser light and transmits an optical image of sample to camera 15. A time of flight mass spectrometer 1 is utilized to capture and analyze the ions.

A turbo pump 12 pumps the vacuum chamber (prior art). A "T" shape adapter 9 holds the microscopic objective positioner 8 and fiber optic 7. The X,Y positioner/micrometer 10 moves the microscopic objective 6 in the X and Y co-ordinates. The Z positioner/micrometer 10 moves the microscopic objective 6 in the Z co-ordinate. A mirror/collimating coupler from fiber optic 7 collimates the laser beam to the aperture of the fiber optic.

While this embodiment described herein uses a time of flight mass spectrometer for capturing, detecting and analyzing the ions, it is to be understood that the capture, detecting and analysis of the ions may be accomplished using any one of a number of well known analytical devices. It is also contemplated that light in wave lengths other than ultra-violet (e.g. infrared) are within the scope of the invention and that the light may be transported by other well-known methods of transferring coherent light sources.

EXAMPLE 1

The present invention was tested using Angiotensin I (mw 1296.9) that was purchased from Sigma (St. Louis, Mo.) in the highest purity available. The UV-MALDI matrices, α-cyano hydroxycinniminic acid (ACHA) and sinnipinic acid (SA) were also purchased from Sigma in the highest purity available. Protein samples were prepared for MALDI analysis by allowing 0.5 μl of protein standard (200 ng/μl) to dry followed by addition of 0.5 μl of matrix solution (10 mg/ml matrix in a 70:30 mixture of 0.1% TFA:acetonitrile. The matrix solution is allowed to dry for 10 minutes after which the sample plate is loaded into the instrument.

Instrumentation

All MALDI mass spectra were collected on a Perseptive Biosystems Voyager SR. Spectra collected in linear mode used an accelerating voltage of 25 kV with a 95% grid voltage and 0.3% guide wire voltage. The m/z range was limited to 11,352.

The sample stage was altered in several ways, with relative locations of each piece described from the perspective facing the instrument front panel. First, two of the PEEK supports for the sample stage towards the rear (nearest the source region turbo pump) of the can were removed. A further modification to the plate holder was made to allow the objective to move directly underneath the sample plate. The majority of the metal on the bottom of the sample stage was machined to leave clear access to the objective with the pin for connection of the extraction potential moved to the front of the stage. The majority of the bottom "skid" of the MALDI plate was removed with only 5 mm portions of "skids" (portion of the plate away from the magnetic base) remaining. The magnetic portion of the base was left attached as well. The bottom of the plate containing the sample wells was machined on both sides with a final thickness of 400 μm. The top, or well side, of this plate had a 2.54 cm diameter portion machined to a depth of 200 μm where a quartz coverslip could be pressed into position covering a 3×3 hole pattern from wells 45 to 47 and 65 to 67. Each of those nine holes was drilled through with a diameter of 1.5 mm.

A Carl Zeiss "Fluar"-type confocal objective lens with >85% transmission at 355 nm was utilized. Quartz fiber optic cable with a low hydroxyl count was purchased from Ocean Optics with a diameter of 300 microns. The purity of this type fiber allowed for a high duty cycle at extreme laser intensities. Alternatively, standard UV-Vis fiber optic cable of 1,000 μm was also used.

The apparatus for positioning was mounted on a PEEK arm threaded for the microscopic objective. The laser used for UV-MALDI was a Coherent Infinity 10–400 Nd:YAG laser. The third harmonic of 355 nm used for ionization. The beam was focused on to the fiber optic for entrance into the confocal objective. The results of this experiment are shown in FIG. 4.

Figure 4:
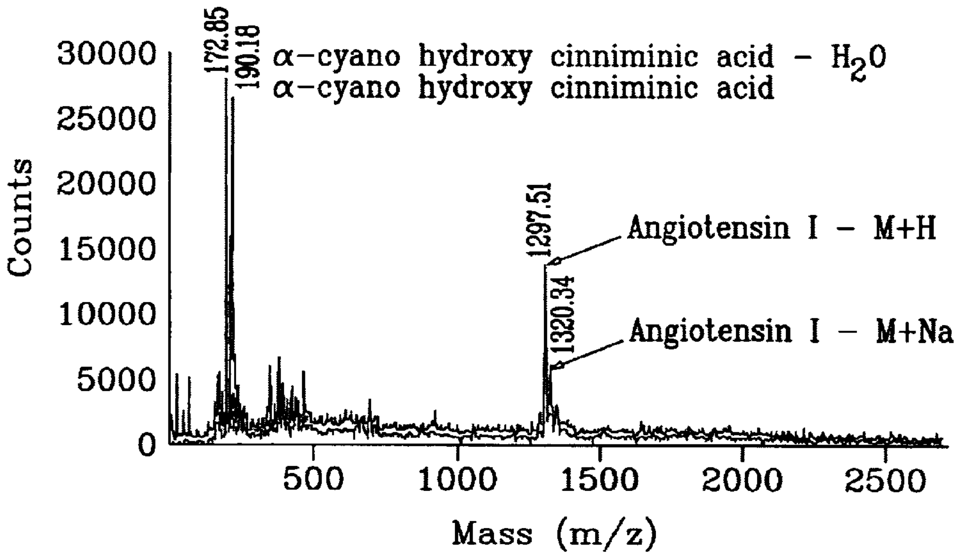

FIG. 4 illustrates the positive ion spectra for angiotensin I (M+H+ average mass 1297.5) collected using a preferred embodiment of the invention and 64 laser shots. The Nd:YAG laser was operated at 20 Hz using a wavelength of 355 nm that was further focused on to the sample using the Carl Zeiss objective. The desorption/ioinization was performed by passing the focused beam through the quartz coverslip. The spectra was obtained in reflectron mode using a 25 kV accelerating voltage with the grid operated at 93%, and guide wire at 0.25%. The matrix ions for α-cyano hydroxy cinniminic acid molecular ion (M+H 190) and common dehydration product are labeled as well as the angiotensin I peak and its sodium adduct.

The sample spot size was estimated to be 2 mm in diameter containing 200 ng of peptide. This amount of material for angiotensin equates to 154 femtomoles within the 0.0314 $cm^2$ (or $3.8\times10^6$ $\mu m^2$) droplet area, or 40 zeptomole/$\mu m^2$. This is well above the minimum detectable concentration range for substance P reported previously at 0.0083 zeptomole/$\mu m^2$ by Keller and Li (Keller, B. O. and L. Li. *J. Am. Soc. Mass. Spectrom.*, 2001, 12, p. 1055–1063) thus substantiating a particular advantage of the claimed invention in its ability to detect proteins in extremely small samples. Assuming equal sample distribution across the spot (40 zeptomoles/$\mu$m$^2$) the 414 nm diameter spot (0.134 $\mu$m$^2$) would contain 5.4 zeptomoles of angiotensin.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features herein before set forth and as follows in scope of the appended claims.

What is claimed is:

1. A system for matrix assisted laser desorption/ionization (MALDI) comprising:

a. a coherent light source to generate light;

b. at least one confocal microscopic objective to create a desorption/ionization source at the surface of a MALDI sample plate adapted to receive a biological sample substrate within the focal working distance of the microscopic objective;

c. at least one fiber optic cable to transport the light to said at least one confocal microscopic objective;

d. at least one collimating fiber optic coupler to collimate the light to an aperture of said at least one fiber optic cable;

e. an insulating microscopic objective holder to hold said at least one confocal microscopic objective and insulate said at least one confocal microscopic objective from the electrical fields of the MALDI;

f. at least one adapter to secure the said objective holder;

g. at least one X, Y positioner to move said confocal microscopic objective in X and Y co-ordinates;

h. a Z positioner to move said confocal microscopic objective in the Z co-ordinate; and i. a mass analyzer to analyze said sample substrate.

2. A system as described in claim 1, wherein said at least one confocal microscopic objective is positioned above said sample plate.

3. A system as described in claim 1, wherein said sample plate is transparent.

4. A system as described in claim 3, wherein said at least one confocal microscopic objective is positioned below said transparent sample plate.

5. A system as described in claim 4, wherein said mass analyzer comprises at least one ion mobility spectrometer.

6. A system as described in claim 4, wherein said mass analyzer comprises at least one evacuated internal chamber.

7. A system as described in claim 1, wherein said mass analyzer comprises at least one ion mobility spectrometer.

8. A system as described in claim 1, wherein said mass analyzer comprises at least one evacuated internal chamber.

9. A system as described in claim 1, wherein said confocal microscopic objective and said sample plate are positioned outside of a vacuum chamber.

10. A system for focusing light to a less than 0.5 micron spot size area for matrix assisted laser desorption/ionization (MALDI) comprising:

a. a coherent light source to generate ultra-violet light;

b. at least one confocal microscopic objective to create a desorption/ionization source of less than 0.5 micron spatial resolution at the surface of a MALDI sample plate adapted to receive a biological sample substrate within the focal working distance of the microscopic objective;

c. at least one fiber optic cable to transport the ultra-violet light to said at least one confocal microscopic objective;

d. at least one collimating fiber optic coupler to collimate the light to the aperture of said at least one fiber optic cable;

e. at least one insulating microscopic objective holder to hold said at least one confocal microscopic objective and insulate said at least one confocal microscopic objective from electrical fields of the MALDI;

f. at least one adapter to secure the said objective holder;

g. at least one X, Y positioner to move said confocal microscopic objective in X and Y coordinates;

h. a Z positioner to move said confocal microscopic objective in the Z co-ordinate; and i. a mass analyzer to analyze ions desorbed from said sample substrate.

11. A system as described in claim 10, wherein said at least one confocal microscopic objective is positioned above said sample plate.

12. A system as described in claim 10, wherein said sample plate is transparent.

13. A system as described in claim 12, wherein said at least one confocal microscopic objective is positioned below said transparent sample plate.

14. A system as described in claim 13, wherein said mass analyzer comprises at least one ion mobility spectrometer.

15. A system as described in claim 13, wherein said mass analyzer comprises at least one evacuated internal chamber.

16. A system as described in claim 10, wherein said mass analyzer comprises at least one ion mobility spectrometer.

17. A system as described in claim 10, wherein said mass analyzer comprises at least one evacuated internal chamber.

18. A system as described in claim 10, wherein said confocal microscopic objective and said sample plate are positioned outside of a vacuum chamber wherein the described ions are transmitted into mass spectrometer's evacuated chamber.

19. A process for focusing a light source to a sub-micron spot size for matrix assisted laser desorption/ionization (MALDI), comprising the steps of:

a. depositing a biological sample substrate containing analyte and an appropriately absorbing matrix on a sample plate;

b. generating a coherent light source;

c. positioning said sample plate within the focal working distance of at least one confocal microscopic objective;

d. coupling said at least one confocal microscopic objective to said coherent light source with at least one fiber optic cable;

e. positioning said at least one confocal microscopic objective in a geometry that does not interfere with the path of desorbed sample ions;

f. focusing said coherent light source through said at least one microscopic objective to create a desorption/ionization ultra-violet source of submicron spatial resolution directed at said sample substrate;

g. ionizing said sample substrate; and h. separating and detecting ions from said ionized sample substrate in one or more stages using an appropriate mass separation and analysis method.

20. A process as described in claim 19, further comprising positioning said at least one confocal microscopic objective above said sample plate.

21. A process as described in claim 19, further comprising providing said sample plate as a transparent member.

22. A process as described in claim 21, further comprising positioning said at least one confocal microscopic objective below said transparent member.

23. A process as described in claim 22, further comprising separating and detecting ions from said ionized sample substrate using at least one ion mobility spectrometer.

24. A process as described in claim 22, further comprising separating and detecting ions from said ionized sample substrate using mass analyzer with at least one evacuated internal chamber.

25. A process as described in claim 19, further comprising separating and detecting ions from said ionized sample substrate using at least one ion mobility spectrometer.

26. A process as described in claim 19, further comprising separating and detecting ions from said ionized sample substrate using a mass analyzer with at least one evacuated internal chamber.

27. A process as described in claim 19, wherein said confocal microscopic objective and said sample plate are positioned outside of a vacuum chamber wherein the desorbed ions are transmitted into mass spectrometer's evacuated chamber.

28. A process for creating a correlated optical image of the ion desorption region associated with matrix assisted laser desorption/ionization (MALDI) of a biological sample substrate comprising the steps of:

a. depositing a biological sample substrate containing analyte and an appropriately absorbing matrix on a sample plate;

b. generating a coherent light source;

c. positioning said sample plate within the focal working distance of at least one confocal microscopic objective;

d. coupling said at least one confocal microscopic objective to said coherent light source with at least one fiber optic cable;

e. positioning said at least one confocal microscopic objective in a geometry that does not interfere with the path of desorbed sample ions;

f. focusing said coherent light source through said at least one microscopic objective to create a desorption/ionization ultra-violet light source of submicron spatial resolution directed at said sample substrate;

g. ionizing said sample substrate; and h. separating and detecting ions from said ionized sample substrate in one or more stages using an appropriate mass separation and analysis method;

i. illuminating the sample;

j. transferring an optical image of the ionized sample substrate using said at least one fiber optic cable; and k. capturing an optical image of said ionized sample substrate.

29. A process as described in claim 28, further comprising providing at least one confocal microscopic objective positioned above said sample plate.

30. A process as described in claim 28, further comprising providing said sample plate as a transparent member.

31. A process as described in claim 30, further comprising providing said at least one confocal microscopic objective positioned below said transparent member.

32. A process as described in claim 31 further comprising providing said mass separation and analysis method is with at least one ion mobility spectrometer.

33. A process as described in claim 31, further comprising providing said mass separation and analysis method is within at least one evacuated internal chamber.

34. A process as described in claim 28, further comprising providing said mass separation and analysis method is with at least one ion mobility spectrometer.

35. A process as described in claim 28, further comprising providing said mass separation and analysis method is within at least one evacuated internal chamber.

* * * * *